(12) United States Patent
Ferrar et al.

(10) Patent No.: US 8,012,915 B2
(45) Date of Patent: Sep. 6, 2011

(54) FUSER FLUID

(75) Inventors: Wayne T. Ferrar, Fairport, NY (US); Jerry A. Pickering, Hilton, NY (US); David F. Cahill, Rochester, NY (US); Peter S. Alexandrovich, Rochester, NY (US); Andrew J. Hoteling, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 305 days.

(21) Appl. No.: 11/875,264

(22) Filed: Oct. 19, 2007

(65) Prior Publication Data

US 2009/0105100 A1    Apr. 23, 2009

(51) Int. Cl.
*C10M 105/68* (2006.01)
(52) U.S. Cl. ............................................. 508/107
(58) Field of Classification Search ................ 524/860; 399/333; 430/110; 528/10; 106/2; 508/107
See application file for complete search history.

(56) References Cited

U.S. PATENT DOCUMENTS

| | | | |
|---|---|---|---|
| 4,101,686 A | 7/1978 | Strella et al. | |
| 4,264,181 A | 4/1981 | Lentz et al. | |
| 4,272,179 A | 6/1981 | Seanor | |
| 4,705,704 A | 11/1987 | Lane et al. | |
| 4,853,737 A * | 8/1989 | Hartley et al. | 399/333 |
| 5,141,788 A | 8/1992 | Badesha et al. | |
| 5,157,445 A | 10/1992 | Shoji et al. | |
| 5,281,506 A | 1/1994 | Badesha et al. | |
| 5,512,409 A | 4/1996 | Henry et al. | |
| 5,516,361 A * | 5/1996 | Chow et al. | 106/2 |
| 5,531,813 A | 7/1996 | Henry et al. | |
| 5,568,239 A | 10/1996 | Furukawa et al. | |
| 5,627,000 A | 5/1997 | Yamazaki et al. | |
| 5,636,012 A | 6/1997 | Uneme et al. | |
| 5,641,603 A | 6/1997 | Yamazaki et al. | |
| 5,780,545 A * | 7/1998 | Chen et al. | 524/860 |
| 5,783,719 A | 7/1998 | Sun et al. | |
| 5,959,056 A | 9/1999 | Beach et al. | |
| 6,261,688 B1 | 7/2001 | Kaplan et al. | |
| 7,074,488 B2 | 7/2006 | Pickering et al. | |
| 7,186,462 B2 | 3/2007 | Gervasi et al. | |
| 7,198,875 B2 | 4/2007 | Gervasi et al. | |
| 7,208,258 B2 | 4/2007 | Gervasi et al. | |
| 7,214,462 B2 | 5/2007 | Gervasi et al. | |
| 2001/0000743 A1* | 5/2001 | Yuasa et al. | 430/110 |
| 2001/0019768 A1 | 9/2001 | Kaplan et al. | |
| 2003/0050420 A1* | 3/2003 | Pickering et al. | 528/10 |
| 2005/0287372 A1 | 12/2005 | Gervasi et al. | |

* cited by examiner

*Primary Examiner* — Michael A Marcheschi
*Assistant Examiner* — Chantel Graham
(74) *Attorney, Agent, or Firm* — Carl F. Ruoff; Andrew J. Anderson

(57) ABSTRACT

The present invention is a release oil of the general formulae:

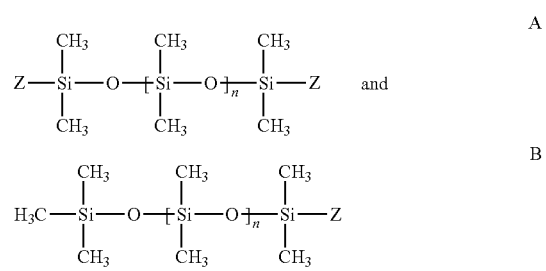

wherein (Z) is an amine. The solvent extracted portion of the release oil has a ratio of A:B less than 1:5. Less than 10% of the molecular weight distribution of the release oil is less than m/z 1000. The release oil preferably has a viscosity of between 200 and 500 centistokes.

10 Claims, 8 Drawing Sheets

FUSER FLUID

FIELD OF THE INVENTION

The present invention relates to electrostatographic image reproduction and, more particularly, to a polysiloxane release oil where a certain proportion of the poly(dimethylsiloxane) (PDMS) chains are terminated at one end with an alkyl amine, and only a certain proportion are terminated at both ends with an alkyl amine.

BACKGROUND OF THE INVENTION

Generally, in electrostatographic reproduction, the original to be copied is rendered in the form of a latent electrostatic image on a photosensitive member. This latent image is made visible by the application of electrically charged toner.

The toner forming the image is transferred to a substrate also referred to in the art as a receiver such as paper or transparent film, and fixed or fused to the substrate. When heat softenable toners, for example thermoplastic polymeric binders, are employed, the usual method of fixing the toner to the substrate involves applying heat to the toner, once it is on the substrate surface, to soften it, and then allowing the toner to cool. This application of heat in the fusing process is preferably at a temperature of about 90° C.-220° C. Pressure may be employed in conjunction with the heat. Various additives and oils are used to aid the transfer of the particles. Silicone oil is commonly used as a release oil because it is thermally stable and incompatible with the toner particles and other polymers in the printer.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. Heat energy employed in the fusing process is transmitted to the toner on the substrate by the fuser member. Specifically, the fuser member is heated; to transfer heat energy to the toner situated on a surface of the substrate, the fuser member contacts this toner, and also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. Preferably, the fuser and support members define a nip, or contact arc, through which the substrate is passed. As a matter of preference, the fuser and support members are in the form of fuser and pressure rollers, respectively. One or both of the fuser and support members have a soft layer that increases the nip, to effect better transfer of heat to fuse the toner.

During the fusing process toner can be offset from the substrate to the fuser member. Toner transferred to the fuser member in turn may be passed on to other members in the electrostatographic apparatus, or to subsequent substrates subjected to fusing. Toner on the fusing member can interfere with the operation of the electrostatographic apparatus and with the quality of the ultimate product of the electrostatographic process. This offset toner is regarded as contamination of the fuser member, and preventing or at least minimizing this contamination is a desirable objective.

Toner offset is a particular problem when polyester toners are used. Polyester toners are frequently used in high quality color and black and white printing applications. In particular, offset toner to the fuser member can collect on other members of the fusing subsystem, such as external heating members for heating fuser members, and release agent applicators e.g., oilers. In this regard, release agents can be applied to fusing members during the fusing process, to prevent or minimize toner offset. These agents usually are or include polyorganosiloxanes, particularly polyorganosiloxane oils. The polysiloxanes have anti-adhesive properties that are favorable for protecting the surface of the fuser member, and maintaining the durability of the fuser member.

Modified polysiloxanes having functional groups provide a protective barrier by attaching to the fuser surface via specific interactions between the functional groups and the fuser surface. The interaction of the functional groups with the fuser surface allows the polysiloxane to sterically block contact of the toner with the fuser member surface and provide a protective barrier. Mono-functional polysiloxanes with one reactive functional group may interact with the fuser member or toner surface to provide a protective coating as well as increase the wetting of nonfunctional components in the polymeric release agent composition. Multifunctional polysiloxanes with more than one reactive group also interact in the same manner to provide a protective coating; however, the presence of more than one functional group may allow undesired additional interaction with other components.

As to functional poly-organosiloxanes, U.S. Pat. No. 6,261,688 and U.S. Publication No. 2001/0019768 disclose polymeric release agents comprising organosiloxane polymers with tertiary amino functional groups. Among the tertiary amino functional groups disclosed are those where the N atom has an alkyl or arylalkyl as one substituent group, and an acyl [—C($=$O)—$CH_3$] group as the other. U.S. Pat. No. 5,157,445 discloses a toner release oil composition containing an organopolysiloxane with one or more secondary amino substituents, where the secondary amine N atom has a $C_{1-8}$ alkylene substituent terminated by $NH_2$. Also disclosed as eligible release oil ingredients are organopolysiloxanes having aromatic secondary amino substituents.

U.S. Pat. Nos. 5,531,813 and 5,512,409 disclose secondary amino functional polyorganosiloxanes, where the N atom can have, besides the H atom, a $C_{1-18}$ alkyl or arylalkyl substituent. These patents also disclose the polyorganosiloxanes as monoamino functional polymers, with the monoamino functionality interacting with the hydro-fluoroelastomer surface of a fuser member; this interaction is stated to provide a barrier to the toner, as well as a low surface energy film to release the toner from the surface. Additionally as to monoamino functionality in particular, branched T-type monoamino functional poly-siloxanes, in which the reactive group is attached to a central silicon atom, are disclosed in U.S. Pat. No. 5,516,361.

Functional polysiloxanes are described in U.S. Pat. No. 4,101,686, which discloses polymeric release agents having functional groups such as carboxyl, hydroxy, epoxy, amino, isocyanate, thioether, and mercapto groups. This patent states that the polymeric release agents are applied to a heated fuser member to prevent toner adhesion. Similarly, U.S. Pat. Nos. 4,272,179 and 4,264,181 disclose polymeric release agents which have functional groups, and which are applied to the surface of a fuser member.

Additionally, U.S. Pat. Nos. 5,141,788 and 5,281,506 disclose a fuser member comprising a polyorganosiloxane having reactive functional groups that are grafted to the surface of the cured fluoroelastomer layer. U.S. Pat. No. 4,853,737 discloses a fuser roller having an outer layer comprising a cured fluoroelastomer, with polydiorganosiloxane segments that are covalently bonded to the backbone of the fluoroelastomer;

the polydiorganosiloxanes have functional groups, at least one of which is present on the polydiorganosiloxane chain to form the covalent bond to the fluoroelastomer backbone.

U.S. Pat. No. 7,074,488 discloses mono-functional branched polysiloxanes, wherein the branched siloxane chain provides enhanced coverage of the surface and resistance to extension under shear. This provisional application is incorporated herein in its entirety, by reference thereto.

In addition to functional groups, polysiloxane release fluids have been modified with non-reactive organo groups that promote interaction or wetting of surface components. U.S. Pat. No. 5,780,545 discloses a stabilized polyether modified organosiloxane that acts as a surfactant to promote wetting and that reduces offset. U.S. Pat. Nos. 5,568,239, 5,641,603, 5,627,000, and 5,636,012 disclose polyorganosiloxanes modified with side groups or end groups of fluorocarbon chains, for promoting the wetting of fluorocarbon surfaces such as tetrafluoroethylene. U.S. Pat. Nos. 5,783,719 and 5,959,056 disclose long chain hydrocarbon modification of organosiloxanes as solid release agents, and as being useful for other purposes e.g., sealing toner cartridges; further, it is suggested that the long hydrocarbon chain may also act as a surfactant for the toner.

U.S. Pat. Nos. 7,208,258; 7,214,462; 7,198,875; 7,186,462 and U.S. Patent Application US 2005/0287372 to Xerox states that the level of multifunctional aminosiloxane in the release fluid is related to the amount of gel formed on the fuser roller. This in turn affects toner offset to the fuser roller and print quality defects. These patents teach techniques to control the level of functionality of the siloxane, to make aminosiloxanes where the functional group is internal or pendant to the polymer backbone. The functional groups are located along internal parts of the polymer chain but are not solely at the end of the chains.

It would be desirable to have an agent that promotes wetting as a surfactant, and that also exhibits reactivity to and/or interaction with polar sites—on the toner, or on the fuser member surface to act against or combat adherence of the toner to surfaces, or to polar sites on fuser members, that tend to attract toner offset. It would further be desirable that the composition could be easily prepared. It would yet additionally be desirable that the composition have labile hydrogen for reacting to surfaces.

SUMMARY OF THE INVENTION

The present invention is a release oil of the general formulae:

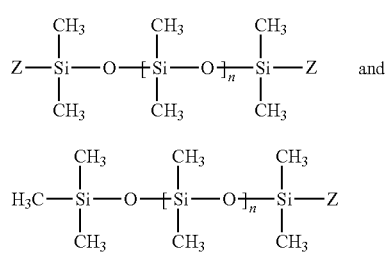

wherein (Z) is an amine. The solvent extracted portion of the release oil has a ratio of A:B less than 1:5. Less than 10% of the molecular weight distribution of the release oil is less than m/z 1000. The release oil preferably has a viscosity of between 200 and 500 centistokes.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figures 1A, 1B:
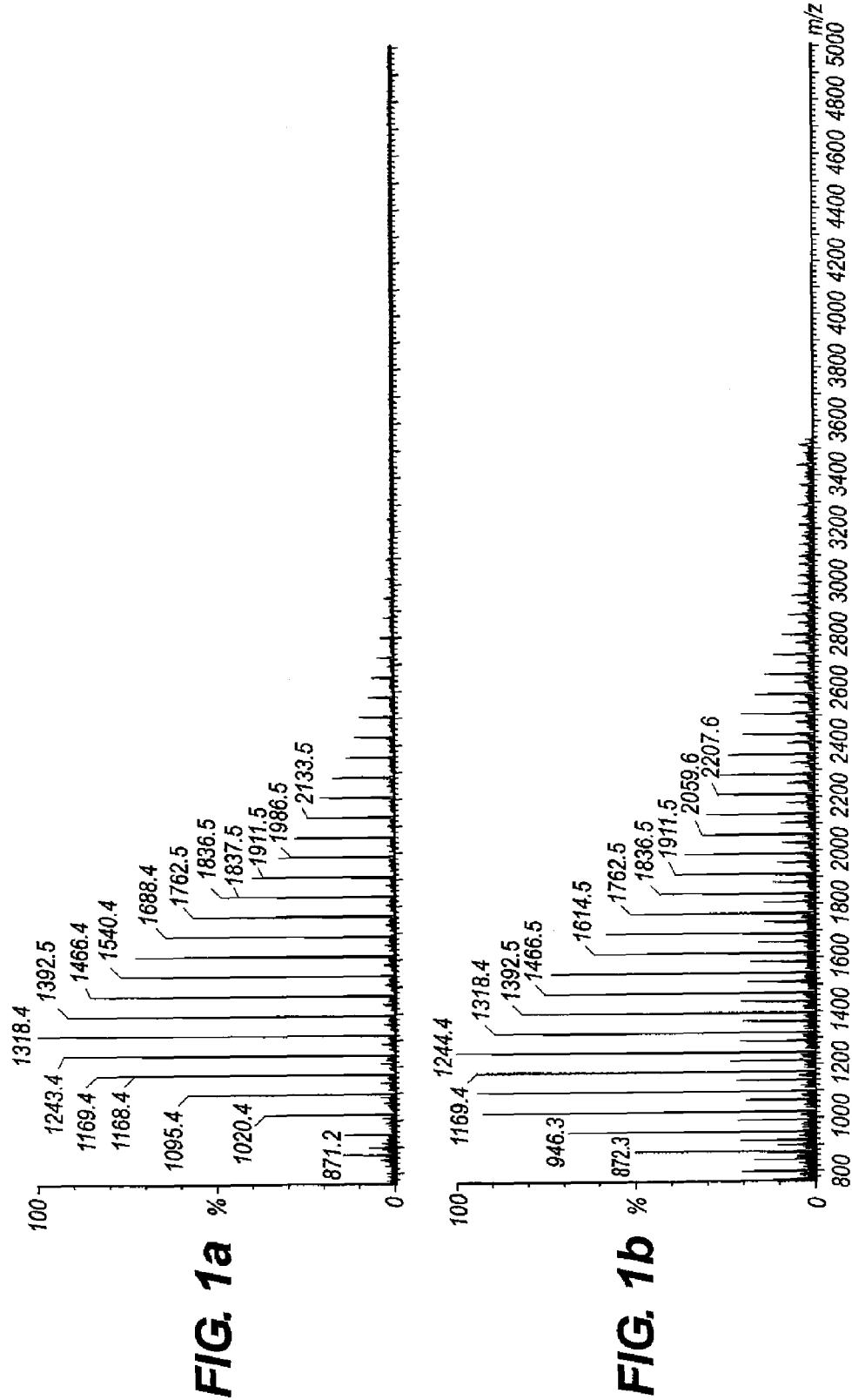
FIG. 1 a) is the positive-ion reflectron MALDI TOF MS spectra of the methanol extracts of fuser oil made using one-pot polymerization; and 1 b) is the positive-ion reflectron MALDI TOF MS spectra of the methanol extracts of fuser oil made using blended fuser oil.

For a better understanding of the present invention together with other advantages and capabilities thereof, reference is made to the following description and appended claims in connection with the preceding drawings.

DETAILED DESCRIPTION OF THE INVENTION

The present invention relates to functional polysiloxanes dispersed in a nonfunctional siloxane where the functionality is an amino group at the end of the siloxane chain. The functional siloxane chain is primarily mono-functional. Preferably the polymers of the invention are used as a toner release fluid and have a number average molecular weight of about 3,000 or greater. More preferably, polymers of the invention have a number average molecular weight of from about 4,000 to about 250,000, and still more preferably of from about 6,000 to about 100,000. The siloxane fluid has a viscosity of from about 200 cSt to about 500 cSt and an amine concentration between 0.0080 and 0.018 meq/g.

The present invention provides superior fuser fluids can be prepared from amino-siloxanes where the functional group is terminal to the polymer backbone and predominantly only at one end. This is done by carrying out the polymerization to produce a desired level of mono-functional polymers where the functionality is on the end of the polymer chain. The mono-functional aminosiloxane polymer reacts with imperfections in the fuser roller surface to form a thin protective layer of low surface energy PDMS. We have found that the presence of difunctional amino-siloxanes in the fuser fluid leads to the formation of thick gels on the fuser roller that cause image artifacts in fused prints. The low level of difunctionality was accomplished by a modification of the procedure shown in Scheme 1. The judicious choice of ratio of functional and non-functional endcappers was made such that the amine ended overwhelmingly on only one end the polymer chain, and at the same time with the desired level of functionality and viscosity of the system resulting in superior release fluids. These fluids have greatly reduced tendencies to form gels on the fusing rollers that has been shown to lead to objectionable image artifacts.

Furthermore, careful purification to remove low molecular weight aminosiloxane oligomers is also important in improving image quality of the prints. This is true even for systems with very low levels of difunctional siloxanes. The improvements are observed by little change in image gloss in high density regions of the prints.

The superior fluids are readily recognized by a combination of chemical analysis. In addition to, titration to determine the overall amount of amine present in the release fluid, molecular weight and viscosity measurements to determine the flow characteristics, mass spectrometry can be applied to identify the individual polymer chains that make up the fluid. The combination of these techniques allows for strong correlation between the chemical structure produced by the polymerization technique and the imaging properties of these aminosiloxane fluids. These polymer chains that carry mostly one alkyl amine in the terminal position of the chain where it is most accessible for binding to defects on the fuser roller surface provide superior protection against toner offset.

Synthesis

Release Oils having Functional Alkylamino End Groups in Combination with Nonfunctional End Groups on Polydimethylsiloxane Backbones.

The synthesis can be done in a one step or two step process that involves variations on the ring opening polymerization reaction depicted in Scheme 1. Ring opening polymerization of octamethylcyclotetrasiloxane (D4) terminated or end-capped with 1,3-bis(3-aminoproyl)tetramethyldisiloxane (1) and hexamethyldisiloxane (2) can be used to prepare aminosiloxane for release agents in electrophotographic printers. The reaction is an equilibrium polymerization and other monomer sources of dimethylsiloxane can be used in place of the four membered ring. The important point is the number of repeat units, n, is determined by the ratio of D4 or other dimethylsiloxane source to the endcappers. Higher n results in higher viscosity due to higher polymer molecular weight. The number of amine end groups compared to the number of unfunctionalized end groups is determined by the ratio of end cappers to each other. Equal molar concentrations (1) and (2) produce polymers with a 1/2/1 ratio of nonfunctional to monoaminofuncitonal to diaminofunctional end groups. A desired level of the aminosiloxane can then be prepared by blending the aminosiloxane concentrate with non-functionalized PDMS, which is commercially available in a variety of molecular weights. Approximately seven parts by weight of PDMS, viscosity of 330 CPS may be mixed with one part of the aminosiloxane concentrate to prepare the final release agent. This will be referred to as the blended method of synthesis.

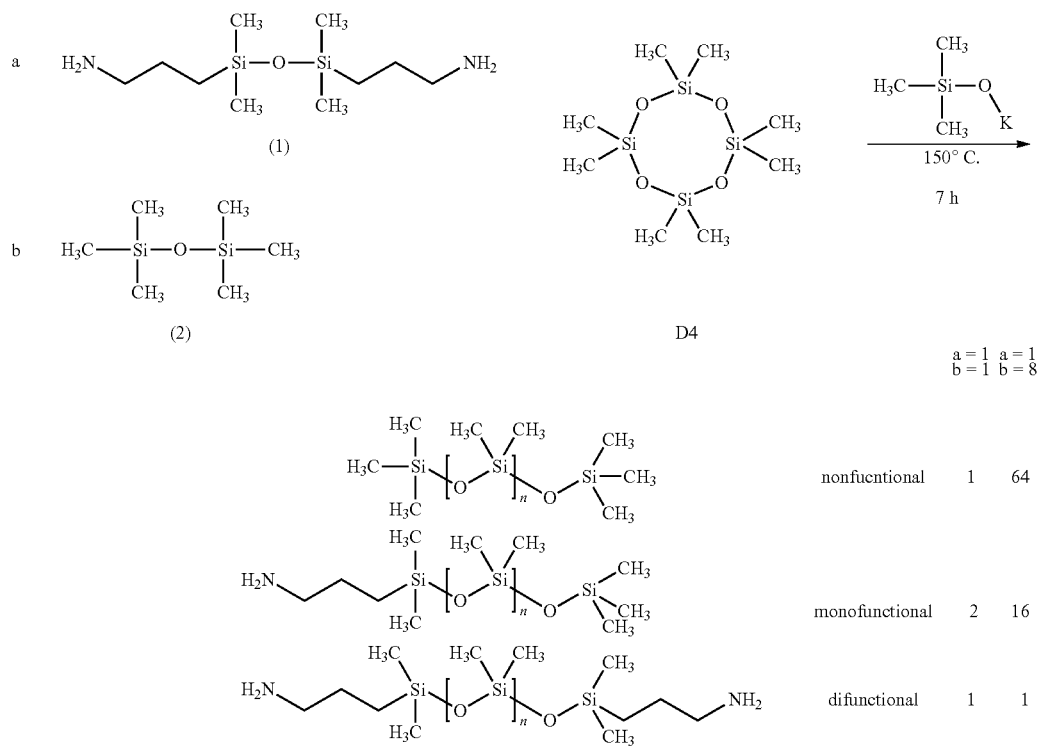

An alternative synthetic scheme is to prepare the final product in one polymerization. Instead of preparing a concentrate of the aminofunctionalized siloxane and then mixing with nonfunctional polymer to give a desired amine level, the polymerization is carried out in one step in a single reaction kettle. This is referred to as a one-pot method of synthesis. The same products are made by both procedures but the distribution of the products is a consequence of which method is used to make the polymer. As the level of non-functionalized endcapper (1) is increased in comparison to the amino endcapper (2), the amount of the mono-functionalized polymer increases and the amount of difunctional polymer decreases. This is a desirable outcome of the one-pot polymerization because high levels of difunctional aminosiloxane in the release oil will gel on the fuser roller, which leads to unwanted image artifacts in the electrophotographic prints.

Scheme 1 also shows that the level of bisamine is greatly decreased if the entire sample of release fluid is prepared by the one pot process. The proper ratio of endcappers to employ in the polymerization can be determined by applying the equation below. A ratio of 8 times as much nonfunctional end capper to difunctional endcapper results in a 16 fold excess of mono-functional polymer to difunctional polymer. This can be seen in applying the concentration of the two end cappers to a positive binomial expansion of $(ax+by)^2$ shown in Equation 1:

$$(ax+by)^2 = a^2x^2 + 2axby + b^2y^2 \quad \text{Equation 1}$$

where x and y represent the nonfunctional and difunctional endcappers, respectively, and a and b represent the molar ratio of each in the starting material of the polymerization.

Thus for the case where a=8 and b=1 as in the one pot synthesis, $$(8x+1y)^2 = 64x^2 + 16xy + 1y^2$$

where
$x^2$ represents the nonfunctional polymer
$xy$ represents the mono-functional polymer
$y^2$ represents the difunctional polymer.

This polymer would produce 16 molecules of mono-functional material for each molecule difunctional polymer and 64 PDMS chains that have nonfunctional trimethylsilyl end groups. Thus about 20% of the molecules carry functional groups.

Substituting in the values for a concentrate polymerization where a=b=1:

$$(1x+1y)^2 = 1x^2 + 2xy + 1y^2$$

Thus the concentrate polymerization should produce 1 part nonfunctional PDMS, 2 parts mono-functional aminosiloxane, and 1 part of the difunctional aminosiloxane polymer. The concentrate would then mixed with about 7 parts of nonfunctional PDMS to produce the final fuser oil with the correct level of aminosiloxane that would be useful as a release fluid. These two levels are contrasted in Scheme 1. Of course this calculation is an idealized reaction. The true kinetics of polymerization would produce different ratios. For example, the rate of polymerization of the substituted chain is probably slightly different than the nonfunctional polymer chain. Nonetheless, we have found that application of this approach to making fuser fluids produces highly desirable materials.

The predicted level of functionality for the polymerization products is given as a function of the endcapper input into the reaction in the Table 1.

TABLE 1

Polymer End Group Ratios Based on Endcapper Starting Material

| a | b | $a^2$ | 2ab | $b^2$ |
|---|---|-------|-----|-------|
| 1 | 1 | 1 | 2 | 1 |
| 1 | 2 | 1 | 4 | 4 |
| 1 | 3 | 1 | 6 | 9 |
| 1 | 4 | 1 | 8 | 16 |
| 1 | 5 | 1 | 10 | 25 |
| 1 | 6 | 1 | 12 | 36 |
| 1 | 7 | 1 | 14 | 49 |
| 1 | 8 | 1 | 16 | 64 |
| 1 | 9 | 1 | 18 | 81 |

The level of amine in the release fluids can be determined by titration with an acid. The value is preferably between 0.0080 and 0.018 meq/g, most preferably between 0.010 and 0.016 meq/g, dictated by the requirements to prevent toner offset and contamination onto the fuser roller. Thus the level of amine must remain relatively constant in a release fluid, which restricts amounts of amine used in the synthesis. Additionally the molecular weight of the siloxane polymer is important to control the viscosity of the fluid. As the molecular weight is increased, the number of chains ends is decreased. Thus there is an optimum molecular weight that gives a desired viscosity while also controlling the functionality of the chain ends. We have found that by judicious choice of the reactant concentrations, a release fluid that has a desired ratio of chain end functionality can be produced which has superior fusing performance. The amines are present on the chain ends as dictated by the functional endcapping moiety that is employed. The ratios of the mono-functional and difunctional amino-siloxanes, as well as the level of non-functional siloxane can all be controlled to produce release fluids that have less tendency to form gels on the fusing roller or lead to contamination of other fusing components. Additionally the viscosity can be controlled so that fusing performance does not suffer.

The terms mono-functional and difunctional are meant to relate to the number of silicon end groups that carry amino functionality. Each of these chains could have a number of alkylamines in either a linear or a cyclic fashion.

This could be accomplished using 1,3-bis(2-aminoethylaminomethyl)tetramethyldisiloxane as the functional endcapper in the polymerization. Other amine endcappers include N-(2-aminoethyl)-3-aminopropyl, N-(6-aminohexyl)aminopropyl, N-(2-aminoethyl)-3-aminoisobutyl, 4-aminobutyl or 2-aminoethylaminomethyl. However, release oils with these types of functional groups may be less thermally stable and/or have a greater tendency to form gels than the molecules with a single aminopropyl end group. Preferred end cappers are the combination where (1) in Scheme 1 is hexamethyldisiloxane and (2) is 1,3-bis(3-aminopropyl)tetramethyldisiloxane. Alternatively, the end mono-functional endcapper 3-aminopropylpentamethyldisiloxane could be used along with hexamethyldisiloxane to produce a similar distribution of functional groups on the release oil.

Spectroscopic Characterization

Surface characterization techniques show that the gel that builds on the fuser rollers with printing is to a large extent a silicone polymer. Techniques such as Attenuated Total Reflectance Infra red (ATR-IR) spectroscopy, X-Ray Photoelectron Spectroscopy (XPS), and Secondary Ion Mass Spectrometry (SIMS) all show the gel on the fuser roller to be high in PDMS sequences. The analysis is facilitated by the fact that the fuser rollers used in the high speed color printers have fluorocarbon overcoats. Descriptions of these rollers are given in U.S. Pat. No. 6,429,249 Fluorocarbon Thermoplastic Random Copolymer Composition and U.S. Pat. No. 5,824, 416 Fuser Member Having Fluoroelastomer Layer, which are incorporated by reference herein. The fuser overcoat allows for easy differentiation between the silicon rich gel and the fluorocarbon roller surface to which it is bonded. Among the defect sites that the aminosiloxane is intended to cover would be residual olefins in the fluorocarbon surface. These olefins are meant to act as cross linking sites when the fluorocarbon overcoats are formed, but sometimes remain in the fluorocarbon due to insufficient cross linking agents. At the high temperatures that a fuser roller operates, the aminosiloxane is sufficiently reactive to add to the double bond and cover this surface defect. The mono-functional aminosiloxane polymer reacts with these and other imperfections in the fuser roller surface (such as an exposed filler particles) to form a thin protective layer of low surface energy PDMS. However, high levels of difunctional amino-siloxanes in the fuser fluid will lead to the formation of thick gels on the fuser roller that cause image artifacts in fused prints. The difunctional amino-siloxane is thought to leave a highly reactive amine exposed on the surface of the roller. While we do not claim to understand the mechanism by which these silicone gels form on the rollers, the availability of the high surface energy aminosiloxane functional group that are tethered to the surface can result in a situation where the free functional end groups can react with other materials in the electrophotographic process to form the gels.

Studies of the silicone fluids to predict which will form gels is more difficult. Chemical analysis can reveal the levels of functionality within an aminosiloxane fluid, but until recently there have been few techniques to characterize and differentiate the polymer molecules that contain any degree of functionality. We have found that these release oil structures can be substantiated by employing mass spectrometry as a way to characterize the fluids. We have found that the level of each functional siloxane polymer in the release oil can be determined indirectly using mass spectrometry. Extraction of the release agent with a polar solvent preferentially extracts the amino-siloxanes. These extracts can then be analyzed by matrix assisted laser desorption/ionization (MALDI) time of flight mass spectroscopy or gas chromatography/mass spectrometry (GC/MS). The ability to identify each type of molecule present in a polymer distribution of a release fluid is extremely powerful. Other analytical methods, while capable of measuring the average functional concentration, are not capable of differentiating the number of functional groups in each polymer chain. For example, titration will reveal the concentration of amino end groups in a polymer system, but cannot be used to determine the molecular weight distributions of mono and difunctional molecules separately. However, differences in structures of the release oil where the amine is terminal and where the amine is pendant along the siloxane chain can be delineated through spectroscopic techniques. NMR can be used to determine the composition of the release fluid, including whether the amine is in the terminal position or pendant on the polymer similar to a side group. NMR can also be used to determine the molar concentration of the amine. But NMR cannot determine the distribution of the end group functionality within the polymer system. In other words, one could not use titration, NMR, size exclusion chromatography (SEC) or UV-visible infra red spectroscopy to determine what ratio of mono-functional and difunctional end groups are present in a polymer used as a release fluid. We describe below how mass spectroscopy can be used to determine release fluids with superior properties.

The fuser oil samples exist as a blend of aminopropyl-PDMS made from the concentrate as shown in Scheme 1 with trimethylsilyl (TMS) terminated-PDMS (~1:7). This dilution in trimethylsilyl-PDMS made it difficult to express the aminopropyl-PDMS component(s) of the oils by MALDI. The aminopropyl-PDMS component(s) was known to be present based on NMR and titration evidence. In an effort to express the amine-containing components of these samples by MALDI, the samples were extracted with methanol. It was demonstrated (by SEC) that only the low MW portion of the polymer distribution is being extracted into the methanol, which simplifies the sample with regard to molar mass. The amine-containing components were known to form protonated molecular ions by MALDI, while TMS-terminated PDMS form Na-cationized molecular ions. Care was taken to eliminate residual sodium from the sample preparation process, causing the cationization of TMS-terminated PDMS to be suppressed, in order to express only the amine-containing components of the samples. This included using plastic vials to prepare solutions and extractions, using low-sodium matrix material, treating the matrix solution with cation-exchange resin, adding 18-crown-6 to the sample preparation as a sodium-scavenger, and washing the sample plate with ammonium citrate. The resulting MALDI spectra show the expression of the amine-containing components of the samples.

The MALDI mass spectra of the amine portions of two extracted release oil samples are in FIG. 1. It is important to note that there are two types of discrimination issues that are possible with the direct MALDI analysis of this polymer. First, since it is a fairly high molar mass PDMS, it most likely has a broad polymer distribution. The peaks observed in the MALDI spectrum are likely biased towards the low molecular weight end of the distribution. Second, since there are multiple distributions present with end groups of varying polarity (e.g. amine vs. no amine), there is likely a bias in the relative intensity of these distributions due to ionization discrimination issues. Therefore, the relative intensities should not be considered quantitative. After looking at a range of samples, we determined that the relative intensities of the amine-containing components can be used to make directional comparisons.

FIG. 1 shows the MALDI spectra of the extracted release oil made from the concentrate method and the one-pot method. The lower spectrum (FIG. 1b) is that of the 1/2/1 concentrate diluted with trimethylsilyl terminated PDMS. The spectrum consists of two distributions of singly charged ions covering the molecular weight range of m/z 800 to 4800. The larger of the two sets of peaks in each case is the mono-aminosiloxane oligomer series. The smaller set of peaks is the diaminosiloxane oligomer series. It is important to note that the difunctional siloxane is clearly visible in the spectrum of the material made from the blended method but not in the spectrum of the one-pot sample (FIG. 1a). The low intensity of the difunctional amine peaks indicates a lower concentration of the difunctional siloxane is formed in the one-pot method.

Figure 2:
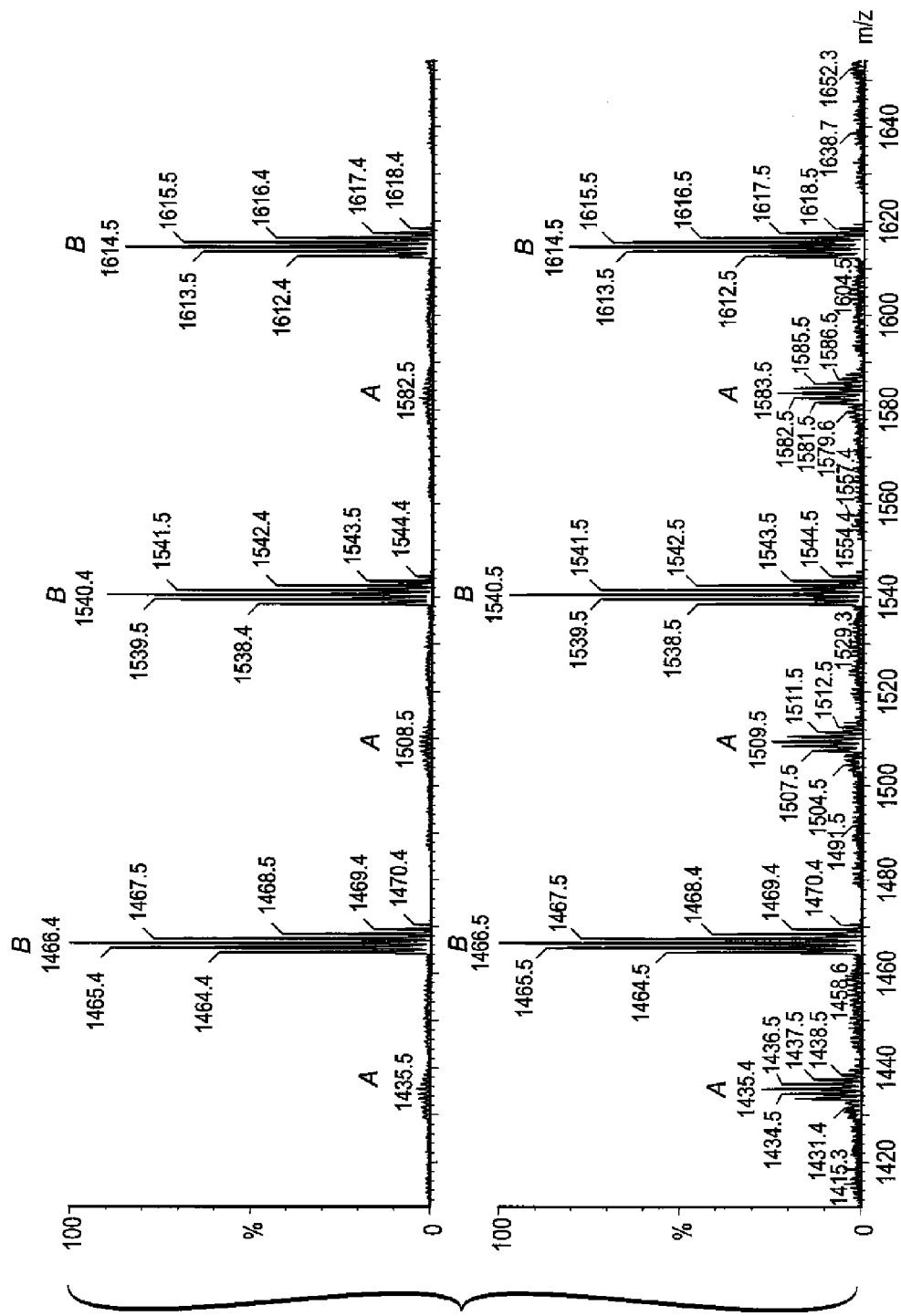
FIG. 2 is an expanded region of the positive-ion reflectron MALDI TOF MS spectra of the methanol extracts of fuser oil made using one-pot polymerization (upper spectra); and fuser oil made using blended fuser oil (lower spectra.

An expansion of the two above spectra gives a better indication of the difference in molecular weight between the mono and difunctional siloxanes. These are shown in FIG. 2. The molecular weight of the each set of peaks increases by m/z 74. This corresponds to the $SiO(CH_3)_2$ repeat unit of the aminosiloxane polymers. Both the lower and upper spectra show predominantly the mono-functional material as represented by (B) in the FIG. 2. The large middle (B) peak represents a mono-functional amino-propylsiloxane oligomer with 18 repeat units. This is calculated by using the mono-isotopic mass (this is usually the first isotope peak). The mono-amine siloxane oligomers have a combined end-group mass of 205.132. The PDMS repeat unit is 74.0188. H is 1.0078, which adds to the molecule in the ionization process (protonation). If n=18, then . . . 205.132+(74.0188)n+1.0078=1538.478 for the center (B) ion. This is a good fit for the corresponding peak in the spectrum (m/z 1538.4, mass to charge ratio).

The lower spectrum from the concentrate sample also clearly shows the bisaminosiloxane oligomers (A). If n=18, then . . . 248.174+(74.0188)n+1.0078=1581.520 for the highest molecular weight ion difunctional ion (A) in the lower spectra of FIG. 2. This is a good fit for the corresponding oligomer in the spectrum, which shows m/z 1581.5. In contrast, the upper spectrum where the polymer was prepared by the one-pot method shows only a trace of the diaminosiloxane oligomer series.

Further support for the assignment of these peaks comes from the application of the "nitrogen rule" in mass spectrometry. The mono-aminosiloxane oligomers in protonated spectra such as these MALDI samples should have molecular ions with even mono-isotopic m/z values. The bisaminosiloxane oligomers should have odd molecular ions by the nitrogen rule. The interpretation is complicated by the high molecular weight of these compounds, where the decimal mass-offset start to add up and will eventually exchange between even and odd mass. Thus the molecular weight for the n=18 oligomers of the mono-aminosiloxane (B) series at 1538.478 would be considered an even number, consistent with one amine in the MALDI. The molecular ion 1581.520 would be an odd number as expected for two nitrogen atoms in the n=18 oligomer series (A). However at n=46, the mono-isotopic mass would be 3611.004 for the bisamine series due to the decimal mass effect.

The difference in the chemical composition of the release oil shows the expected trend of high levels of bisamine oligomers when the release oil is prepared by the blend method. In other words, the MALDI is consistent with expected trends of functionality on the siloxane oligomer based on Equation 1. Additional evidence for this prediction is gained by the related analytical technique of gas chromatography/mass spectroscopy (GC/MS) shown in FIG. 3. GC/MS compliments the type of information that is obtainable by MALDI. Samples made by the blend and one-pot methods were analyzed to look for differences in mono- and bisaminopropyl PDMS species. These samples were extracted with acetone prior to GC/MS analysis. The acetone extraction in the GC/MS analysis served two purposes. The extraction concentrated the amino-siloxanes to make the analysis easier, favoring the low molecular weight components. It also derivatized the amino moieties to their corresponding imines. Compounds were identified by interpretation of the mass spectral data and/or comparison with known library reference spectra. There are two parts to FIG. 3.

The upper chromatogram represents linear and cyclic PDMS and derivatized mono and bis-aminopropyl linear PDMS compounds detected in the sample extracts. This contains both functional and non-functional siloxanes making up the Total Ion Chromatogram (TIC). The chromatogram is dominated by PDMS that contains no functionality, the portion of which was soluble in acetone and volatile enough to go through the GC column. The spectrum is fairly symmetrical. This should not be taken as quantitative evidence of the sample distribution, but is useful to compare samples. Superimposed on the large peaks are other sets of peaks, which correspond to the mono-substituted (B) and bisaminosiloxanes (A).

Figure 3:
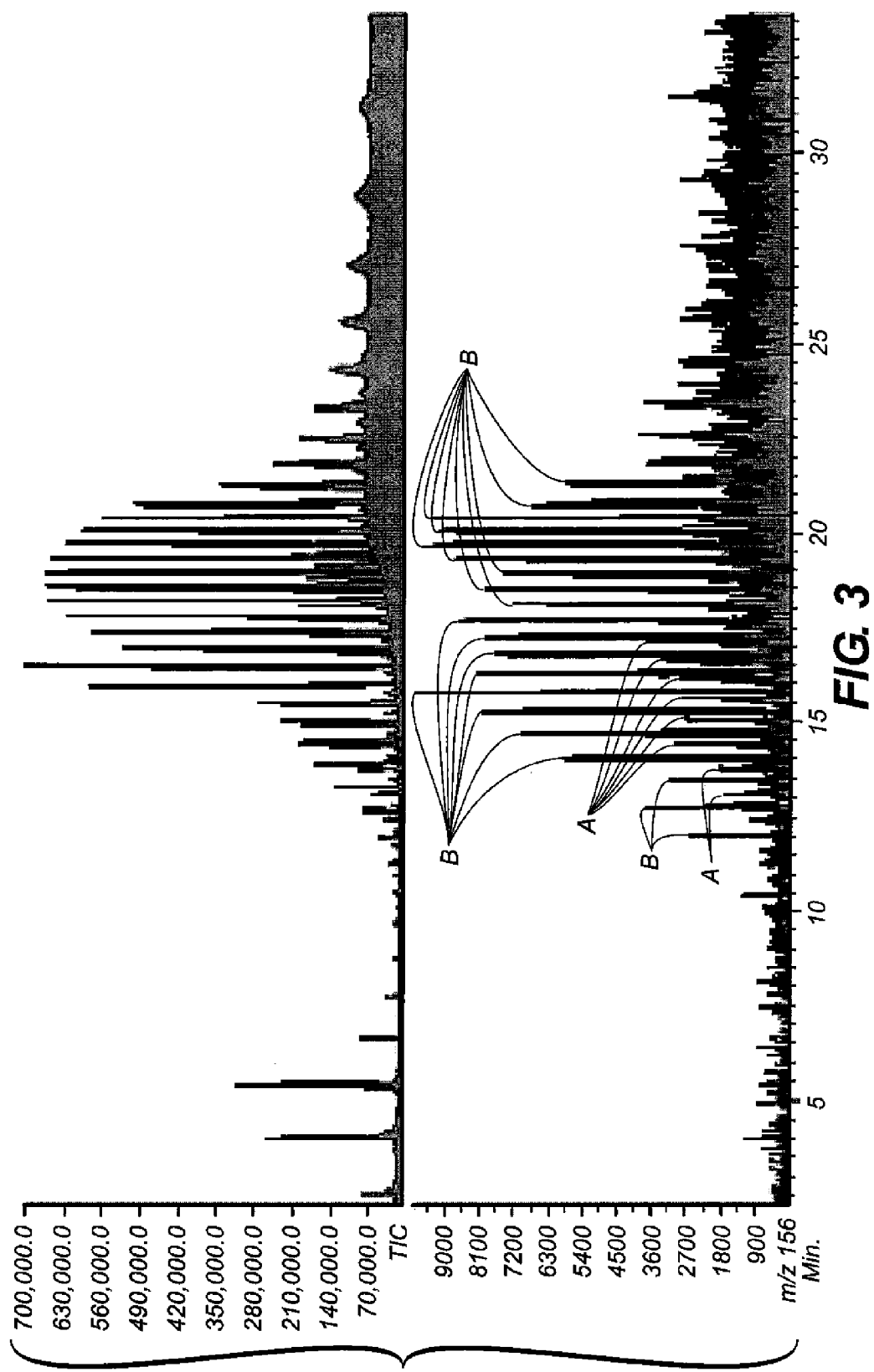
FIG. 3 is a GC/MS of acetone extracted sample from blended fuser fluid (upper spectra) and a GC/MS of acetone extracted sample of the amine portion from blended fuser fluid (lower spectra)

The lower spectrum in FIG. 3 shows only the amino-siloxanes. Extracted ion chromatograms (m/z 156) unique to the derivatized amino species (imines) are included with the peaks labeled (A) for the bisaminosiloxane series and (B) for the mono-aminosiloxane series. The series of bisaminosiloxane peaks (A) is the smaller set that is more visible on the left side of the lower chromatogram in FIG. 3. At higher molecular weight the gas chromatography column does not differentiate the bisaminosiloxane peaks as well from the larger distribution of mono-aminosiloxane peaks (B). The two distributions become superimposed and hard to see. This indicates that the resolving power of the two distributions by column chromatography is not as good as with MALDI mass separation. These ions correspond to those discussed above in the MALDI spectra. These chromatograms were generated using the MS software to "extract out" and display this ion from the TICs. The resolution of the mono and bisaminosiloxanes appears good with the lower molecular weight peaks. However the chromatographic separation does not resolve the two sets of peaks for the higher molecular weight members of the series due to overlap after a critical point in the series. There appears to be more bias of the peak ratio information in the GC/MS than in the MALDI. It is noted that the 156 ion is unique to the mass spectra for the derivatized amino compounds and is not found in the linear and cyclic PDMS species. Further, in FIG. 3 all MW labels correspond to the derivatized mono-amino compounds (imines) and are 40 amu higher than the underivatized mono-amino species.

Figure 4:
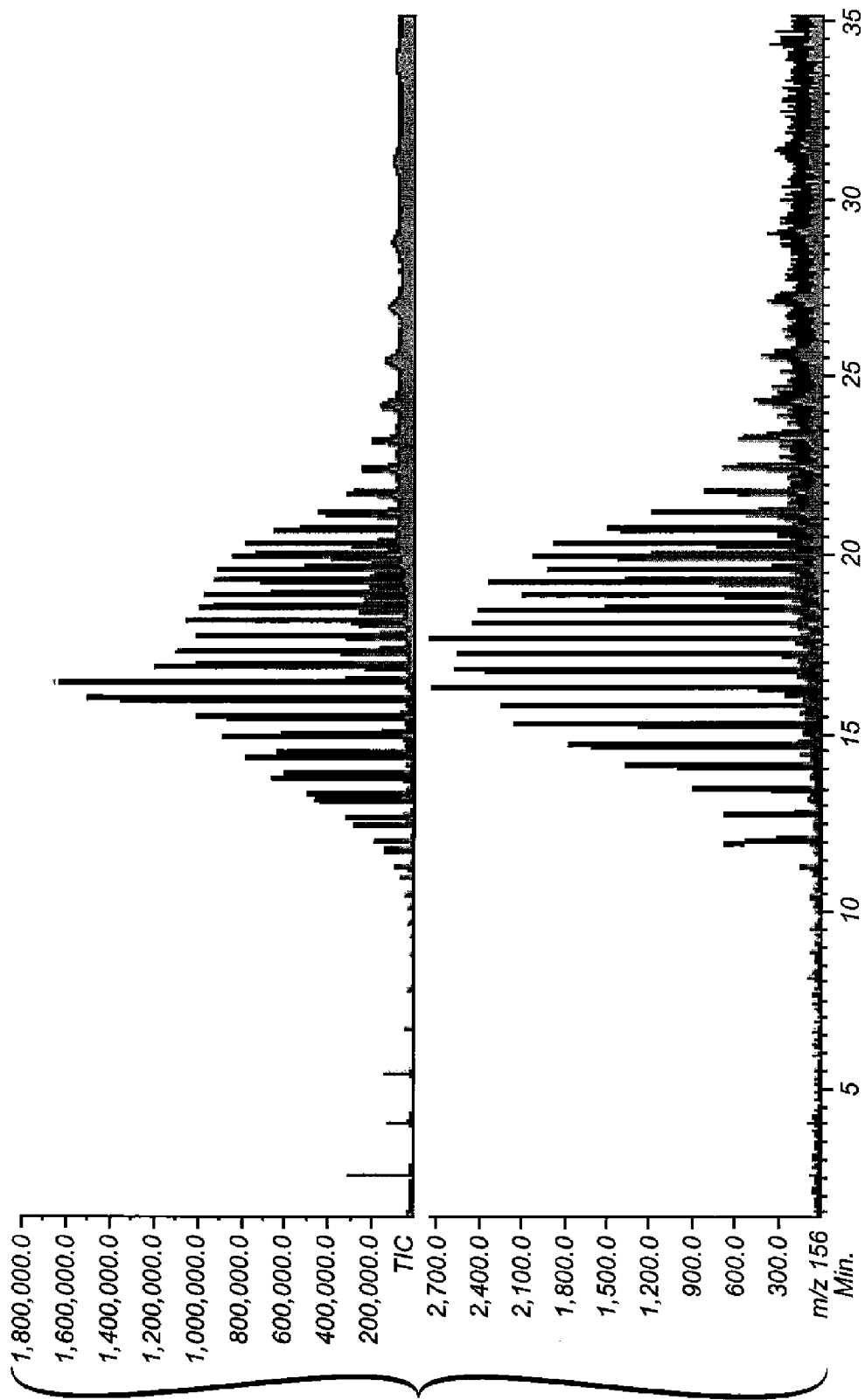
FIG. 4 is GC/MS of acetone extracted sample from one-pot polymerization (upper spectra) and a GC/MS of acetone extracted sample of the amine portion from the one-pot polymerization (lower spectra)

The extraction of a sample made by the one-pot method is shown FIG. 4. The spectrum of the amino-siloxanes in the lower half of the spectrum shows only the monosubstitiuted siloxanes. This is quite different from the concentrate GC/MS spectrum in FIG. 3 made by the blend method. The one-pot method clearly favors the formation of the mono-substituted material at the expense of the bisaminosiloxane. These results agree quite well with the MALDI analysis already discussed.

The silicone oils described above that had high levels of bisaminosiloxane functionality were inferior fuser fluids to those that had low levels of bisaminesiloxane oligomers. But the presence of some bisamine did not result in a bad release fluid. The presence of a low level of bisamines inherent in the terminal positioning of the amine functional groups provide a protective layer against toner contamination, an advantage over the internal or pendent type functional group. The amine fluids produced by the one-pot method gave long life in fusing test of stress documents, lasting far longer without significant gel formation on the fusing roller and without contamination of the fuser compared to the materials made by the blend method. However, a second parameter besides the bisamine functional group ratio that was found to be important for superior release fluids was the extent level of lower molecular weight species. Included in the lower molecular weight fraction of the fluid that is undesirable for the release fluid are low molecular weight mono and difunctional amino-siloxanes. These low molecular weight oligomers were removed by stripping the siloxane oils under high temperature and vacuum. The composition of these extracts removed by stripping was examined by mass spectrometry as shown in FIG. 5.

Figure 5:
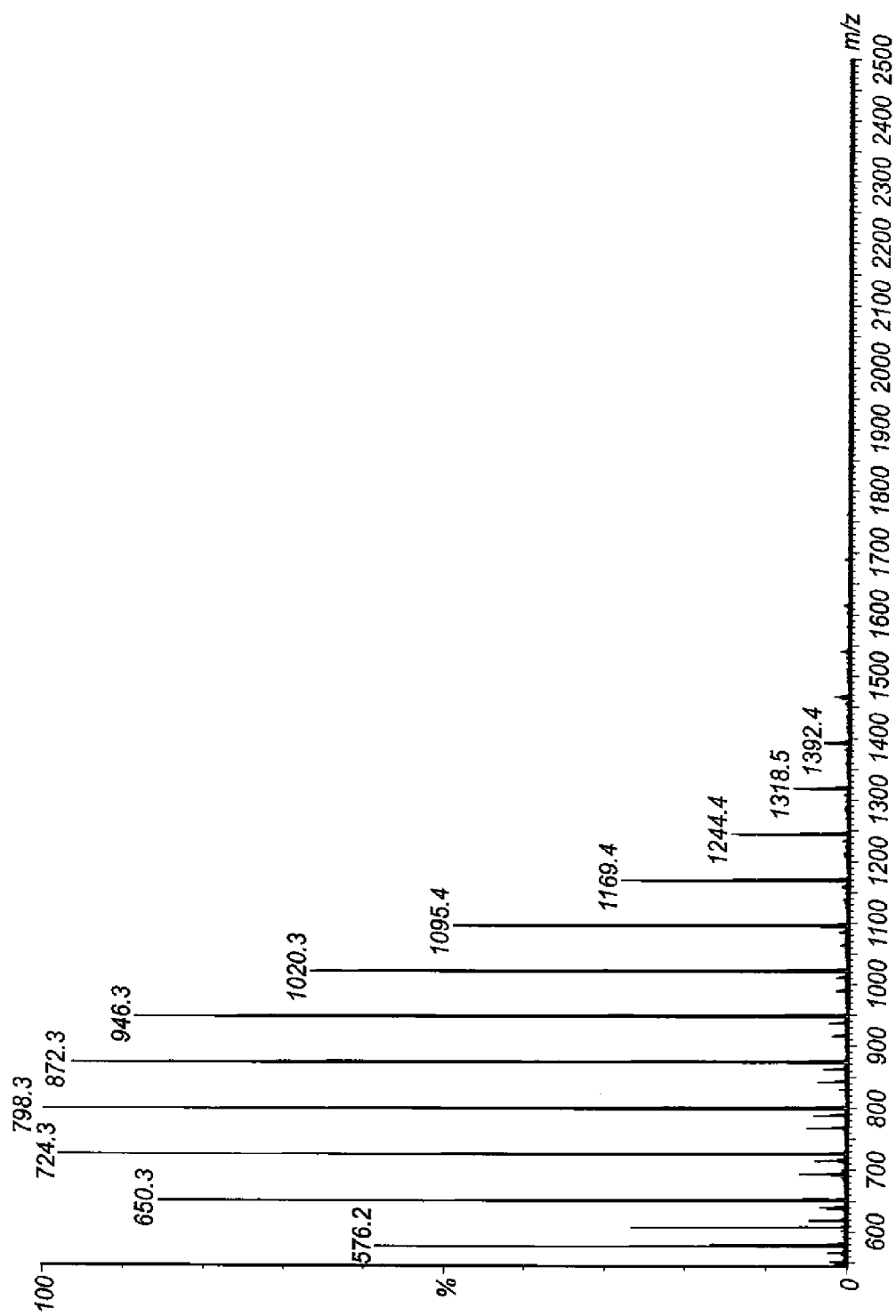
FIG. 5 is the positive-ion reflection MALDI TOF MS spectra of the aminosiloxane oils stripped from a fuser oil made using one-pot polymerization.

The MALDI spectrum of the stripped portion of the fluid in FIG. 5 shows monoamine peaks predominantly below m/z 1000. There is little evidence of the bisaminosiloxane because this material was made by the one pot method. The stripped material was a clear, colorless liquid but with much lower viscosity than the release oil from which it was distilled. It was readily soluble in methanol that eliminated the extraction step used for analysis of the fuser fluids. Thus, the spectrum is probably more representative of the entire sample than observed in the spectra of the release oils themselves, and more representative of the real distribution of the sample.

The largest peak in the spectrum is at m/z 872.3. Applying the fit for the molecular mass of the MALDI ion as described above, this peak represents the mono-aminosiloxane with 9 repeat units.

If n=9, then . . . 205.132+(74.0188)n+1.0078=872.309 for the center (B) ion.

Overall the spectrum represents the amino-siloxanes with up to 15 repeat units. It is not clear if all or part of these amino oligomers are detrimental to the fusing process, but removing them improved the fusing performance of the one-pot release oils.

Figure 6:
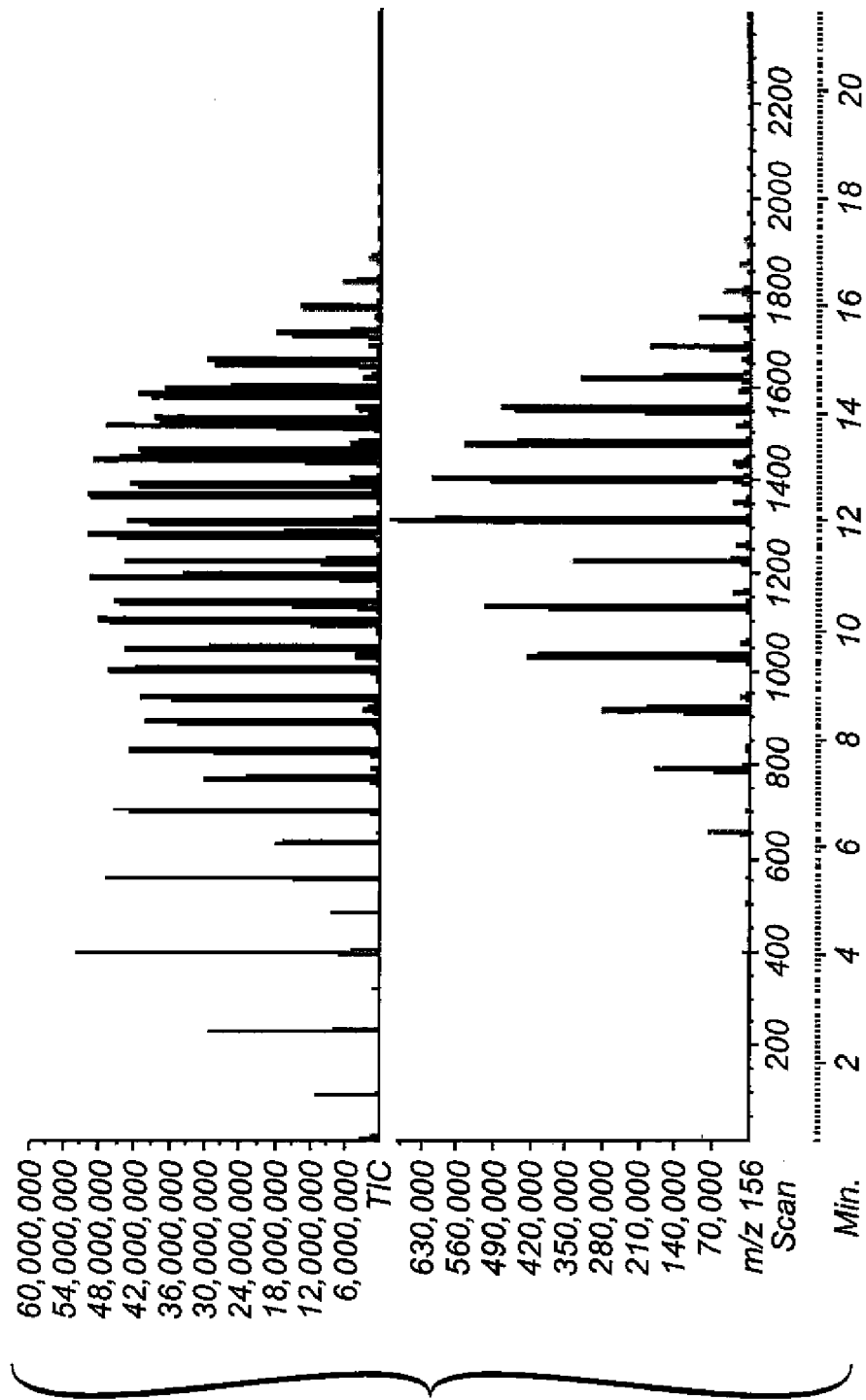
FIG. 6 the Total Ion Chromatogram (TIC) chromatograms of the aminosiloxane oils stripped from the one-pot release oil (upper spectra), the Extracted Ion Chromatogram (m/z 156) (lower spectra).

Additional GC/MS data is consistent with the MALDI findings as shown in FIG. 6. The upper chromatogram is the Total Ion Chromatogram (TIC) for the derivatized sample of the same oil stripped from the one-pot oil. The bottom Extracted Ion Chromatogram (m/z 156) is unique to the derivatized monoamino and diaminopropyl linear PDMS species. As before, the GC/MS gives a more complete picture of the sample composition showing both the cyclic and linear non-functional PDMS. Also as before, the amino portion of the spectrum agrees very well with the MALDI analysis, showing the distribution to be centered around the aminosiloxane with 9 repeat units and extending up to 15 repeat units.

Machine Performance

Figure 7:
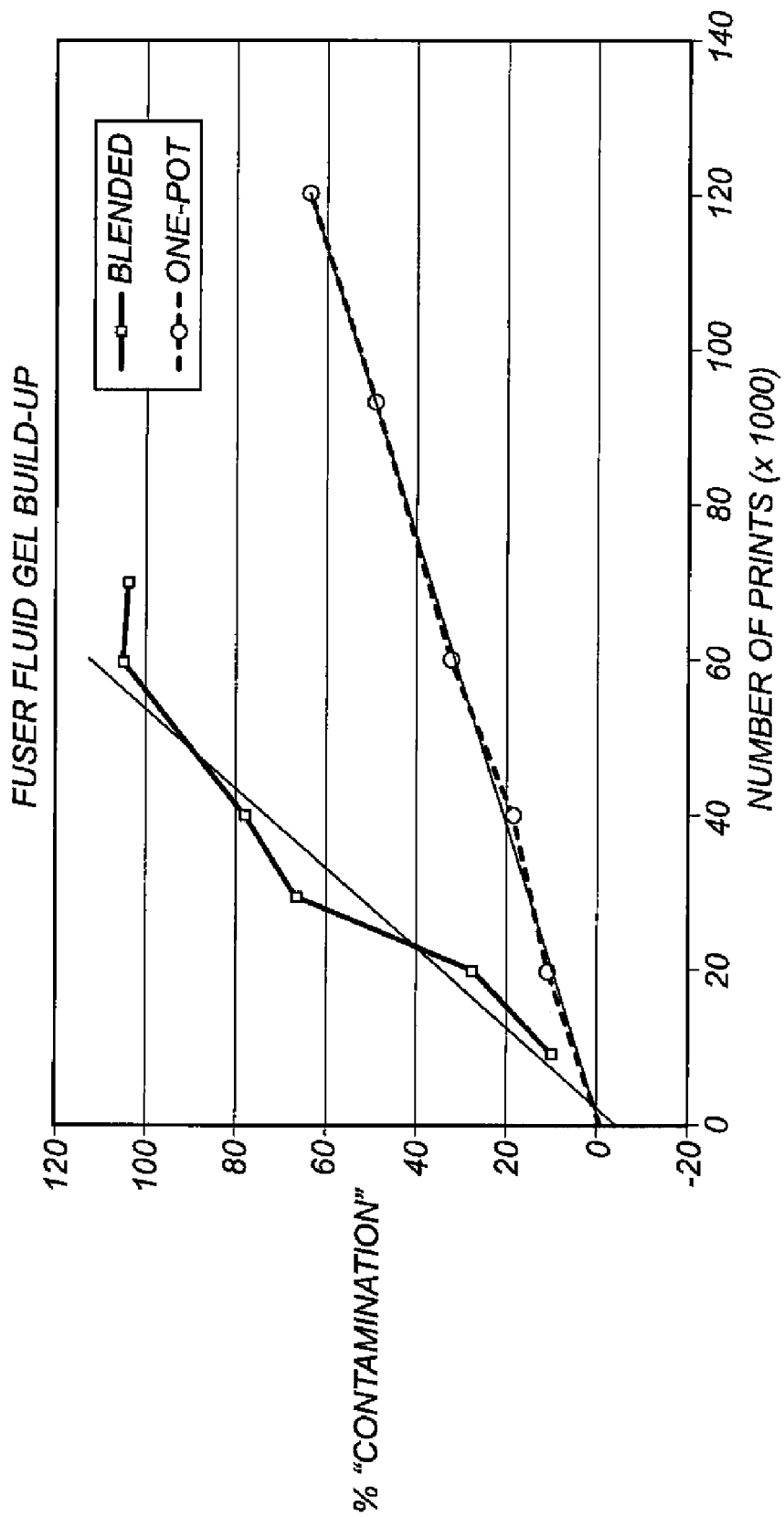
FIG. 7 shows gel build rates for blended and one-pot release oils.

One metric used to compare the oils made from the concentrates and those made by the one-pot method is the rate of detrimental gel build-up during a stress printing experiment. The stress document used was of an image of flatfields, bars, and blank areas in such a pattern that it will produce differential gloss and cross track artifacts on the fuser when printed repeatedly. Periodic image document "keepers" were printed for image quality analysis to determine the level of gloss and cross track artifacts that were caused by the gel on the fuser roller. The gel level was measured using ATR-IR spectroscopy. The intensity of the silicone signal was compared to known silicone and fuser roller base cushion reference samples to give the percent of contamination. The contamination is effected by the spread of toner throughout the fuser subsystem, including the fuser roller, pressure roller, web cleaner, and oiler. The gel level is plotted by measuring the percent contamination as a function of the number of images ×1000 when running a stress document image in the printer. The graph in FIG. 7 shows a rapid build-up of gel on the fuser roller when the material was made from the blended release fluid. The lower line is the result of a much slower gel build-up when using a release fluid from a one-pot synthesis where the bisamine content was lower.

Figure 8:
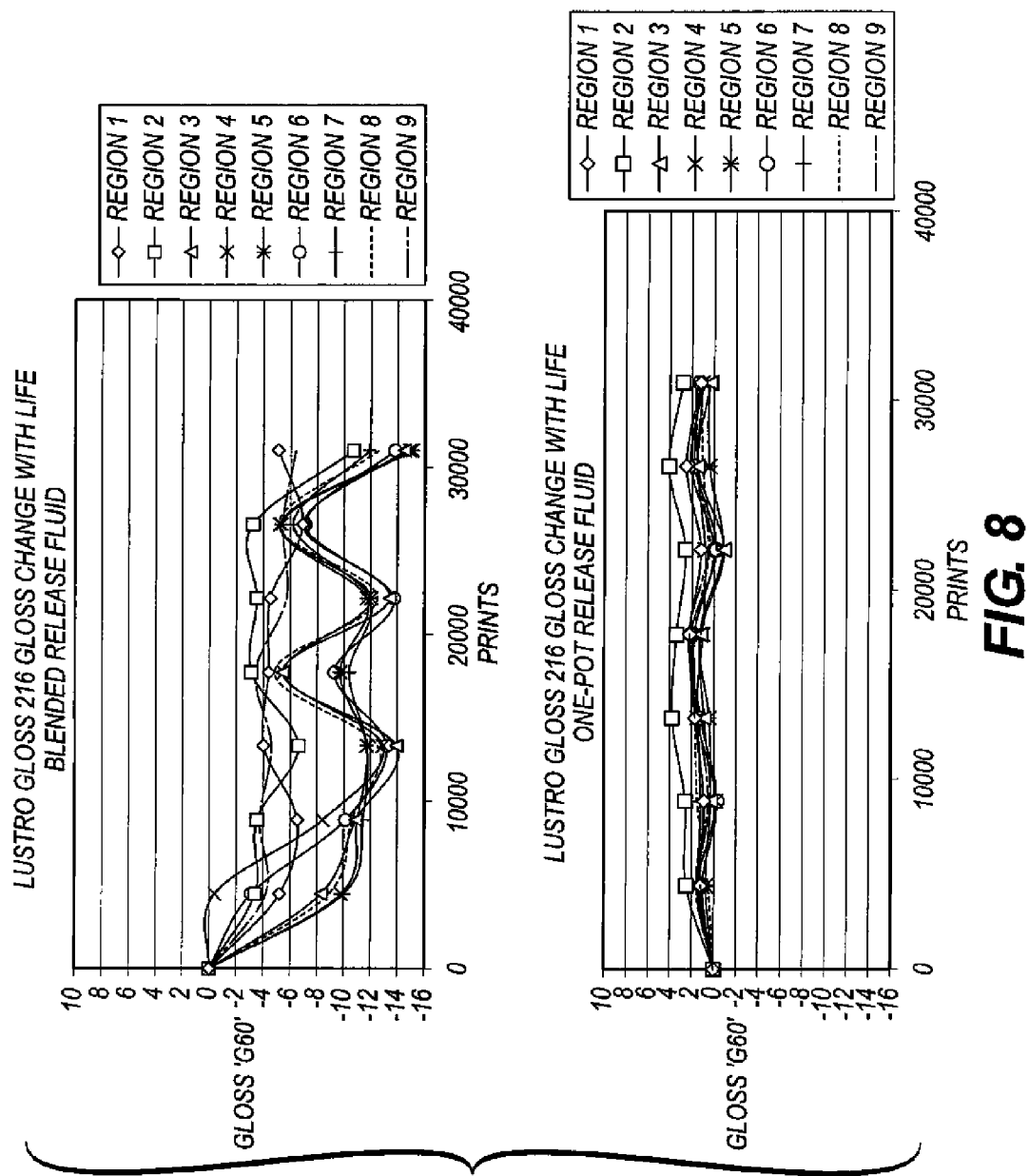
FIG. 8 shows the change in gloss levels in a stress document for blended (upper) and one-pot (lower) release oils.

The change in gloss observed in different regions of a print was monitored by printing 4200 two sided (perfected) copies of the stress document. The image was analyzed by printing flat fields on two types of paper. Gloss measurements were made in nine regions of the flat field image to compare the reflection density across the paper. The process was repeated until more than 31,000 prints were produced. The results of these experiments comparing the blended and one-pot release fluids are shown in FIG. 8. The upper graph shows that gloss decreased in different regions of the receiver as the number of images increased in the test of the blended oil. This release fluid was made by the concentrate method and had a high level of bisamine. Eventually all the regions showed a substantial loss of gloss. A gloss change of six units is generally unacceptable. Switching the release fluid to one made by the one-pot method resulted in images that showed little gloss change during the experiment. As the lower charts show, the gloss does not change by six units in any regions of the image. The conclusion is the gloss is more stable with the one-pot fluid compared to the blended fluid. The one-pot fluid also greatly minimized contamination of the oiler, pressure roller, web cleaner, and other parts of the fusing subsystem. Changing the fluid manufacturing method from blended to one-pot showed significant improvement in fuser life due to gloss loss and increased the number of high quality prints of the other fuser components as toner contamination is reduced.

The present invention is further illustrated by the following examples, but it should be understood that the invention is not in any way restricted to such examples.

EXAMPLES

Titrations of amine in release oils were carried out by dissolving samples in 50/2 (V) THF/MeOH and titrated with 0.1N $HClO_4$. Results are reported in meq/g. The fluoropolymer that makes up the fuser roller overcoat has the composition of 50% vinylidene fluoride (VF), 10% hexafluoropropylene (HFP), and 40% tetrafluoroethylene (TFE). Useful fluoropolymers for the present invention include those where the ranges of $(VF)_x(HFP)_y(TFE)_z$ wherein x=40-70%, y=5-35%, z=10-50%.

MALDI Procedures.

Instrument Conditions: Experiments were carried out using a TofSpec2E Laser TOF mass spectrometer (Micromass, Inc., UK), equipped with a nitrogen laser (337 nm). Samples were analyzed as positive-ions using reflectron mode with an accelerating voltage of 20 KV.

Sample Extraction: Samples were extracted with methanol prior to MALDI analysis. Using plastic vials, 1 mL methanol was added to 100 mg sample and vortex mixed for 1 min. The mixture was centrifuged to separate the two layers. The top (methanol) layer was used for MALDI analysis.

MALDI Sample Preparation: In a plastic vial, a stock solution of 2,5-dihydroxybenzoic acid (DHB) matrix was prepared at 20 mg/mL in methanol and mixed with 50 mg of cation-exchange (hydrogen form) resin to remove residual sodium. In a plastic vial, a stock solution of 18-crown-6 was prepared at 0.5 mg/mL in methanol. Samples were prepared for MALDI analysis by mixing 20 μL of DHB stock solution with 10 μL of methanol layer of the sample extraction and 10 μL of 18-crown-6 stock solution. A 0.5 μL portion of the mixture was deposited onto a stainless steel sample plate and allowed to dry.

GC/MS Procedures.

Release oils were extracted with acetone prior to GC/MS analysis. The acetone extraction served two purposes. The low molecular weight components and more polar amine containing components of the oil were concentrated by the extraction into the solvent. The acetone also reacted with the amine and derivatized the extracted species to the corresponding imines. Each extract was analyzed in duplicate.

Linear and cyclic PDMS and derivatized mono and di-aminopropyl linear PDMS compounds were detected in these sample extracts. Extracted ion chromatograms (m/z 156) unique to the derivatized amino species (imines) were generated using the MS software to "extract out" and display this ion from the Total Ion Chromatograms (TICs). The m/z 156 ion is unique to the mass spectra for the derivatized amino compounds and is not found in the linear and cyclic PDMS species. All molecular weight labels correspond to the derivatized mono-amino compounds (imines) and are 40 amu higher than the native mono-amino species. The information from these spectra is qualitative only but comparisons between samples treated in the same manner were thought to be valid. Compounds were identified by interpretation of the mass spectral data and/or comparison with known library reference spectra.

Characterization of Blended and One-Pot Release Fluids

The two tables below show analytical data of blended release oils made from concentrates (Comparative Examples 1-4) and samples of release oils made by the one pot method (Examples 1-4). Table 1A gives the amine concentration as determined by titration. The level of amine is similar in all of the samples ranging from 0.010 to 0.012 meq/g, MALDI determination of the total molecular weight distribution of the methanol extracted portions of the oil and the molecular weight distribution of the mono-aminosiloxane is also listed in Table 1A. The molecular weight distribution of the bisaminosiloxane extracted in methanol is listed in Table 1B. Additionally, the relative amounts of mono and bisaminosiloxane in the release oil is compared in the last two columns of Table 1B. It is in these last two columns that the difference in composition of the oils made by the two methods stands out. Based on the MALDI analysis of the methanol extractions, the samples of the blended oils made from the concentrates show 16 to 21 relative area percent of the bisaminosiloxane oligomer series compared to the mono-aminosiloxane oligomers. The samples made by the one-pot procedure range from 5 to 8% bisaminosiloxane oligomer series.

TABLE 1A

Amine Concentration and Molecular Weights, Total and Mono-aminosiloxane

| Sample ID | Amine Conc meq/g | Total Siloxane | | | Mono-aminosiloxane | | |
|---|---|---|---|---|---|---|---|
| | | Mn | Mw | Mz | Mn | Mw | Mz |
| comp 1 | 0.0116 | 1572.5 | 1761.4 | 1957.6 | 1662.6 | 1971.4 | 2294.2 |
| comp 2 | 0.010 | 1497.1 | 1617.2 | 1752.3 | 1483.9 | 1590.4 | 1708.6 |
| comp 3 | — | — | — | — | — | — | — |
| comp 4 | 0.0101 | 1505.0 | 1647.1 | 1808.5 | 1479.9 | 1610.3 | 1757.1 |
| 1 | 0.0133 | 1607.2 | 1735.5 | 1875.4 | 1577.9 | 1836.6 | 2141.4 |
| 2 | 0.0110 | 1702.6 | 1809.8 | 1927.1 | 1705.9 | 1806.1 | 1915.0 |
| 3 | 0.011 | 1733.6 | 1822.5 | 1913.9 | 1747.4 | 1830.5 | 1915.2 |
| 4 | 0.012 | 1493.0 | 1638.2 | 1801.6 | 1496.0 | 1626.3 | 1769.1 |

TABLE 1B

Molecular Weights, Bisaminosiloxane and Ratios of Mono and Bisaminosiloxane

| Sample ID | Bisaminosiloxane | | | Mono-Amine Series % | Bis-Amine Series % |
|---|---|---|---|---|---|
| | Mn | Mw | Mz | | |
| comp 1 | 1545.4 | 1703.0 | 1864.9 | 79.7 | 20.3 |
| comp 2 | 1546.2 | 1716.8 | 1915.3 | 78.8 | 21.2 |
| comp 3 | — | — | — | — | — |
| comp 4 | 1633.1 | 1834.5 | 2070.7 | 83.6 | 16.4 |
| 1 | 1609.3 | 1730.0 | 1859.3 | 94.1 | 5.9 |
| 2 | 1633.0 | 1887.9 | 2179.5 | 95.4 | 4.6 |
| 3 | 1565.1 | 1724.0 | 1897.9 | 92.4 | 7.6 |
| 4 | 1455.1 | 1786.9 | 2208.4 | 92.6 | 7.4 |

Tables 2A and 2B show machine testing of the same eight release fluids described in Table 1. A heavier weight coated receiver is discussed first in Table 2A. The tests were carried out by placing the various fluids separately into Kodak Nexpress Color Printers™ as fuser oils and printing up to 62 thousand equivalent A4 duplex prints of a striped target to act as a stress document. The decrease in gloss on the prints was monitored as a function of the number of prints and the appearance of cross-track lines on the fuser roller was also monitored as a function of the print count. The first column of data show that the four blended oils produced prints with inferior gloss, a loss of at least 3 gloss units in less than 5,000 prints. In sharp contrast, more than 30,000 prints were produced using the one-pot release fluids before a comparable loss of gloss was observed. The second column showing a loss of gloss of 6 gloss units showed similar behavior with the one-pot fluids having much longer life times than the release oils made from the concentrates. It is interesting that the one exception to this is the Comparative Example 4a, where the loss of 6 gloss units was not observed until after 40,000 prints. This is almost as long as some of the one-pot release oils ran without producing gloss numbers of 6. Not surprisingly, Comparative Example 4 also had the lowest level of bisaminosiloxane of the four samples made from the concentrates with 16.4% reported in Table 1B. This highlights the importance of the composition of the oil having a low bisaminosiloxane content. The samples with higher bisamine content produced a loss of gloss with fewer prints, indicating a shorter lifetime for these oils.

The third column of data in Table 2A shows the relationship between the release fluids and how quickly a defect on the fuser roller surface is produced. Comparative Examples 1 and 2 both showed early formation of the cross track-line artifacts. These samples had bisaminosiloxane levels greater than 20%. The cross track-line artifact is thought to be related to gel formation on the fuser roller and it appears the gel formation can be related directly to the bisaminosiloxane content of the release oil.

TABLE 2A

| Example | Prints to produce differential gloss of −3 or greater | Prints to produce gloss loss of −6 or greater | Prints to produce a cross track line artifact of 2 |
|---|---|---|---|
| Comp 1a | 4.9 | 4.9 | 14 |
| Comp 2a | 4.6 | 4.6 | 22.3 |
| Comp 3a | 4.5 | 9 | >31 |
| Comp 4a | 4 | 40 | >61 |
| 1a | 31 | 200 | >62 |
| 2a | 40>>62 | 19>>62 | >62 |
| 3a | 68 | 49 | >31 |
| 4a | 39 -> >62 | 135 | >31 |

Table 2B gives the results of the machine performance made using the same criteria to compare the release fluids as Table 2A, with the additional parameter of measuring the amount of contamination on the web used to clean the fuser roller. Higher levels of density cleaning web indicate higher levels of contamination in the fuser. All four Comparative Examples 1-4, but only Examples 1-2, were tested. The conclusions drawn from the data are much the same as from Table 2A. The samples with higher levels of bisamine content do not perform as well in the fusing tests. The samples from the concentrates produced prints with lower gloss more quickly, and tended to show cross track-line artifacts more quickly than the samples from the one-pot procedure. Additionally the samples from the one-pot synthesis had lower cleaning web densities than the samples that had the higher bisamine content. The former had densities of approximately 0.2, while the samples from the concentrates had cleaning web densities of 0.3 and greater, indicating higher levels of contamination with these samples.

TABLE 2B

Onset of Image Artifacts using McCoy Gloss 148 g Receiver

| | Prints to produce differential gloss of −3 or greater | Prints to produce gloss loss of −6 or greater | Prints to produce a cross track line artifact of 2 | Cleaning web density |
|---|---|---|---|---|
| Comp 1b | 13 -> 31 | 16 -> 35 | 20 -> 40 | 0.30 |
| Comp 2b | 22 | 27 | ~31 | 0.37 |
| Comp 3b | >31 | >31 | >31** | 0.37 |
| Comp 4b | 44 | 4 | >61 | 0.35 |
| 1b | >62 | >62 | >62 | 0.18 |
| 2b | >62 | >62 | >62 | 0.23 |

Examples 5-16

An experiment was designed to compare three factors that could be important in the preparation of release oils with good properties. Twelve preparations were carried out following the one-pot procedures described in this work. Two amine concentrations were chosen because the level of bisaminosiloxane was reduced by such a large amount that higher amine incorporation became practical. The aim of one set of fluids was as the original amine level of 0.010 meq/g, which had been traditionally used to produce the blended fuser fluids from the concentrates. The second set of fluids was at a higher level of amine concentration of 0.014 meq/g. A second parameter was the viscosity. Three levels of viscosity were targeted at 380, 330, and 280 mm2/s. Finally, each sample was stripped to three levels of volatiles. The volatiles level was 0.5, 0.3, and 0.1% for a given amount of sample over a given time at an elevated temperature. The volatile measurement was determined by the change in weight of a stripped sample by heating under vacuum. The lower volatile level should produce a sample with higher purity. Lower levels of volatiles should correspond to lower levels of low molecular weight impurities left over from the polymerization, including cyclic and linear siloxanes, the latter composed of non-functional, monoamino- and bisaminosiloxanes. The Table 3 compares the targeted and the actual levels for these twelve samples.

TABLE 3

Variation in One-Pot Release Oils with Amine Concentration, Viscosity, and Stripping Purification

| | Aim | Measured | | | |
|---|---|---|---|---|---|
| Example | Design Levels AN/Viscosity/ % Volatile | Amine meq/g | Viscosity mm$^2$/s | Volatile % 2 g/24 h/ 150° C. | Volatile % 5 g/24 h/ 200° C. |
| 5 | 0.014/.380/0.5 | 0.016 | 392 | 0.20 | 0.42 |
| 6 | 0.014/.380/0.1 | 0.016 | 387 | 0.10 | 0.21 |
| 7 | 0.014/.330/0.3 | 0.015 | 339 | 0.10 | 0.34 |
| 8 | 0.014/.280/0.5 | 0.016 | 269 | 0.40 | 0.51 |
| 9 | 0.014/.280/0.1 | 0.016 | 274 | 0.10 | 0.15 |
| 10 | 0.010/.380/0.5 | 0.011 | 379 | 0.40 | 0.44 |
| 11 | 0.010/.380/0.3 | 0.011 | 386 | 0.10 | 0.40 |
| 12 | 0.010/.380/0.1 | 0.011 | 387 | 0.10 | 0.11 |
| 13 | 0.010/.330/0.5 | 0.011 | 345 | 0.50 | |
| 14 | 0.010/.330/0.1 | 0.011 | 351 | 0.00 | 0.15 |
| 15 | 0.010/.280/0.5 | 0.011 | 295 | 0.40 | |
| 16 | 0.010/.280/0.1 | 0.010 | 296 | 0.10 | 0.15 |

AN = amine conc

Table 4 shows a comparison of the mass spectroscopy data from some of these Examples. The same trend is seen in the two techniques, but the GC/MS data not as discriminating as the MALDI data. In fact for the GC/MS data, many of the other samples were below the detectability limits of the bisamine due to the higher baseline noise in this measurement. It was therefore assumed that these samples all had less than 10% bisaminosiloxane based on the GC/MS spectra because the response was so low compared to the mono-aminosiloxane. What is apparent is the release oils made with higher content of diamine endcapper produced higher levels of bisamine. Examples 5-9 were made with the higher level of amine endcapper, and these samples all showed higher levels of bisaminosiloxane (A) than Examples 10-16 that were made using lower levels of amine endcapper. This was true even though these oils were made by the one-pot technique, as would be predicted for a polymerization with higher ratio of functional endcapper aminopropyldisiloxane (1) to the non-functional endcapper hexamethyldisiloxane (2).

Table 4 also shows that viscosity is not an important component in determining the distribution of mono and bisaminosiloxane in this region of molecular weight change. For a given amine concentration the bisamine content should increase with increased viscosity, but the effect is complicated by the different levels of stripping for the samples. Examples 5 and 8 were made in the same way except the first one had a higher viscosity, and indeed Example 5 has a higher level of (A) at 12.4% compared to 11.7% for Example 8. These differences are so small that the significance may be questionable. The same can be said for the other samples throughout the chart. However the trend is seen throughout the experiment, which lends support to the argument that the viscosity effect is subtle but real.

Stripping the samples had little effect on the ratio of (A) to (B). The point can be illustrated with Examples 10, 11, and 12 in Table 4. These three were identical except for the level of stripping increased with the sample number. The level of (A) did not show any trend, staying at 7.0, 5.4, and 6.6%, respectively. The distillation process probably does not remove one form of amine in great preference to the other. In contrast, the effect of stripping can be seen by looking at the area % of the amine content that is below m/z 1000 shown in the last column of Table 4. The same three examples have amine content decrease from 10.7, 5.2, and 2.1%, respectively. Correspondingly, Examples 5, 8, 10, and 13 all have amine contents greater than 10%, and these are the samples that were stripped to only 0.5% volatiles. Because the Comparative Example 1 has an amine content of 9.8% below m/z 1000, it is desirable that the release oil samples have no higher than 10% of the amine content below m/z 1000. Machine testing supported the contention that the molecular weight distribution of the samples is important for minimizing differential gloss in the prints. Release oils that had lower levels of the low molecular weight components did not show large changes in gloss, while samples with high levels of low molecular weight component due to less efficient stripping did not perform as well.

The fusing performances of these one-pot oils were all good compared to the earlier Comparative Examples that were produced by the concentrates and then blended with the non-functional PDMS. All of these samples were better than Comparative Example 1, which had both high levels of contamination of the fuser and very high gel rates because it had 20% bisamine content (A), which combined to give lower image quality than the new one-pot terminal aminosiloxane release fluids of this invention. Smaller differences were observed within the performance of 5-16. For example, the samples with lower volatiles and higher viscosity gave somewhat better performance. However, Comparative Example 1 resulted in higher gel formation and poorer performance than the one-pot release fluids. This is more evidence that too high of a bisamine content is detrimental to the image quality of fused prints regardless of other variables in the fluid.

TABLE 4

Comparison of GC/MS and MALDI Aminosiloxane Determinations

| Ex | Sample ID | GC/MS Mono-Amine Series % | GC/MS Bis-Amine Series % | MALDI Mono-Amine (B) Series % | MALDI Bis-Amine (A) Series % | Area % amine < m/z 1000 |
|---|---|---|---|---|---|---|
| Comp 1 | 154154 | 83.4 | 16.6 | 79.7 | 20.3 | 9.8 |
| 5 | 0.014/.380/0.5 | >90 | <10 | 87.6 | 12.4 | 16.6 |
| 6 | 0.014/.380/0.1 | 84.5 | 15.5 | 85.3 | 14.7 | 5.4 |
| 7 | 0.014/.330/0.3 | >90 | <10 | 90.9 | 9.1 | 5.1 |
| 8 | 0.014/.280/0.5 | >90 | <10 | 88.3 | 11.7 | 12.4 |
| 9 | 0.014/.280/0.1 | >90 | <10 | 92.1 | 7.9 | 2.5 |
| 10 | 0.010/.380/0.5 | >90 | <10 | 93.0 | 7.0 | 10.7 |
| 11 | 0.010/.380/0.3 | >90 | <10 | 94.7 | 5.4 | 5.2 |
| 12 | 0.010/.380/0.1 | >90 | <10 | 93.5 | 6.6 | 2.1 |
| 13 | 0.010/.330/0.5 | >90 | <10 | 93.8 | 6.2 | 12.0 |
| 14 | 0.010/.330/0.1 | >90 | <10 | 94.5 | 5.5 | 1.8 |
| 15 | 0.010/.280/0.5 | 86.2 | 13.8 | 96.0 | 4.0 | 13.5 |
| 16 | 0.010/.280/0.1 | 87.8 | 12.2 | 95.0 | 5.0 | 1.9 |

The MALDI data showing the molecular weight distributions of the aminosiloxanes of Examples 5-16 are shown in the Table 5.

TABLE 5

Molecular Weight Distributions from MALDI for Designed Experiment

| Example | Total | | | Monoamine | | | Bisamine | | |
|---|---|---|---|---|---|---|---|---|---|
| | Mn | Mw | Mz | Mn | Mw | Mz | Mn | Mw | Mz |
| 5 | 1517.3 | 1734.8 | 1981.7 | 1518.6 | 1710.6 | 1930.0 | 1508.4 | 1905.7 | 2347.2 |
| 6 | 1633.2 | 1824.3 | 2054.6 | 1629.3 | 1795.8 | 2002.2 | 1656.0 | 1989.5 | 2358.1 |
| 7 | 1665.8 | 1854.8 | 2063.6 | 1647.6 | 1818.4 | 2012.1 | 1848.8 | 2220.0 | 2580.0 |
| 8 | 1579.0 | 1805.2 | 2069.3 | 1562.9 | 1766.8 | 2010.3 | 1700.5 | 2094.9 | 2514.2 |
| 9 | 1741.4 | 1920.7 | 2116.7 | 1718.3 | 1881.8 | 2066.2 | 2011.6 | 2375.3 | 2707.4 |
| 10 | 1621.0 | 1834.9 | 2071.3 | 1598.0 | 1798.2 | 2023.7 | 1928.5 | 2325.1 | 2707.6 |
| 11 | 1683.6 | 1874.1 | 2081.2 | 1668.2 | 1847.9 | 2047.1 | 1957.0 | 2337.6 | 2683.5 |
| 12 | 1790.6 | 1975.2 | 2177.5 | 1773.3 | 1945.6 | 2139.1 | 2038.6 | 2396.3 | 2725.5 |
| 13 | 1586.5 | 1801.4 | 2046.2 | 1560.3 | 1763.2 | 1999.8 | 1982.2 | 2378.6 | 2746.5 |
| 14 | 1796.4 | 1979.6 | 2182.8 | 1773.6 | 1946.0 | 2142.7 | 2189.6 | 2560.8 | 2875.2 |
| 15 | 1562.6 | 1773.6 | 2008.9 | 1545.4 | 1746.5 | 1975.6 | 1974.9 | 2424.1 | 2810.3 |
| 16 | 1776.9 | 1950.7 | 2143.0 | 1760.9 | 1922.4 | 2106.1 | 2079.6 | 2484.9 | 2840.5 |

Optimal Polymerizations for Release Oil.

A series of nine polymerizations were carried out at optimal one-pot polymerization conditions with a targeted viscosity of 330 mm$^2$/s and an amine concentration of 0.012 meq/g. The samples were stripped under high vacuum at elevated temperature to remove volatiles and low molecular weight materials. MALDI analysis showed all of the bisaminosiloxane (A) content was less that 10% of the total amine content, and that all of the samples had greater than 90% of the amine content greater than m/z 1000.

All of the samples performed very well as release fluids in NexPress™ color printers. Gel build up was slow as evidence by lack of differential gloss and the prints to produce cross-track line artifacts of 2 after 62K A4 equivalent prints of a stress document.

The invention has been described with reference to a preferred embodiment; however, it will be appreciated that variations and modifications can be affected by a person of ordinary skill in the art without departing from the scope of the invention

The invention claimed is:

1. A release oil comprising poly(dimethylsiloxane) polymers of the general formulae:

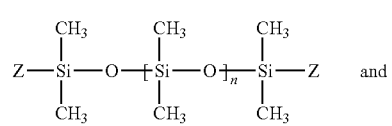 and

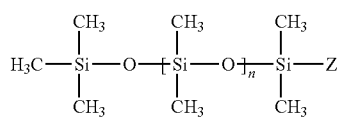

wherein (Z) is an amine, n is the number of dimethylsiloxane repeat units, a solvent extracted portion of the release oil has a ratio of A:B less than 1:5 and less than 10% of the molecular weight distribution is less than m/z 1000 of the solvent extracted portion of the release oil.

2. The release oil of claim 1 wherein the amine comprises aminopropyl.

3. The release oil of claim 1 wherein the amine comprises 1,3-bis(3-aminopropyl)tetramethyldisiloxane, N-(2-aminoethyl)-3-aminopropyl, N-(6-aminohexyl)aminopropyl, N-(2-aminoethyl)-3-aminoisobutyl, 4-aminobutyl or 2-aminoethylaminomethyl.

4. The release oil of claim 1 comprising a viscosity of between 200 and 500 centistokes.

5. The release oil of claim 1 wherein the polymers have a number average molecular weight of about 3,000 or greater.

6. The release oil of claim 1 wherein the amine has a concentration between 0.0080 and 0.018 meq/g.

7. The release oil of claim 1 wherein the polymers have a number average molecular weight of from about 4,000 to about 250,000.

8. A release oil comprising poly(dimethylsiloxane) polymers of the general formulae:

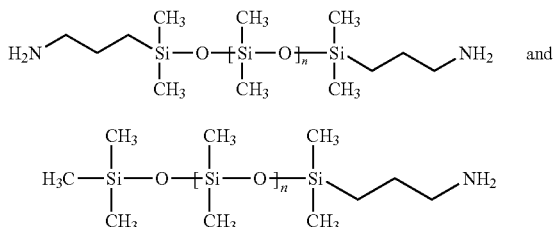

wherein n is the number of dimethylsiloxane repeat units, a solvent extracted portion of the release oil has a ratio of A:B less than 1:5 and no more than 10% of a molecular weight distribution is less than m/z 1000 of the solvent extracted portion of the release oil.

9. The release oil of claim 8 comprising a viscosity of between 200 and 500 centistokes.

10. The release oil of claim 8 wherein the amine has a concentration between 0.0080 and 0.018 meq/g.

* * * * *